March 19, 1963    J. F. MOORE    3,081,496
METHOD OF FORMING FLEXIBLE SHEETS OF CURED FOAMED RUBBER
Filed Oct. 15, 1959
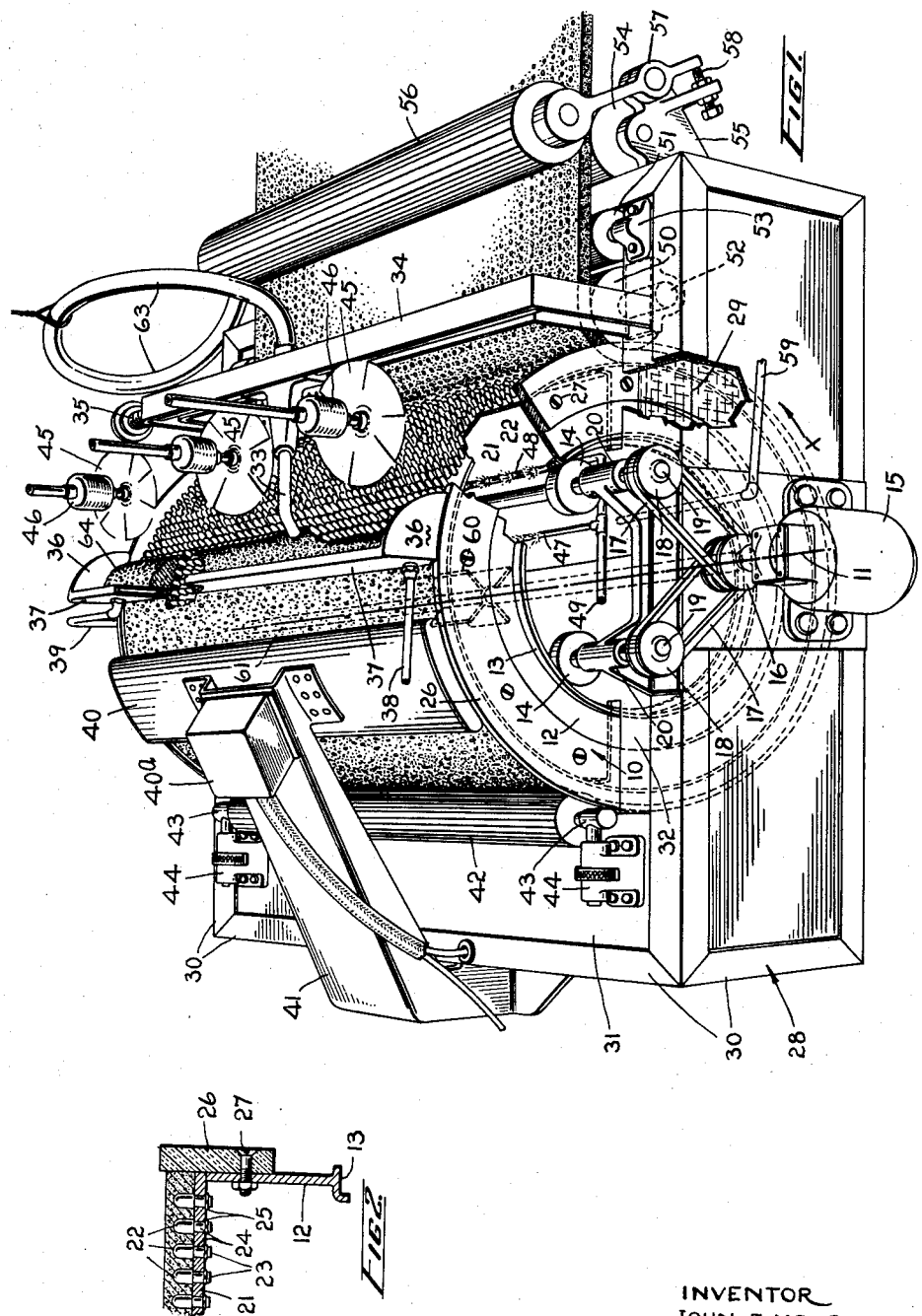
INVENTOR
JOHN F. MOORE
BY
Maybee & Legris
ATTORNEYS

United States Patent Office 3,081,496
Patented Mar. 19, 1963

3,081,496
METHOD OF FORMING FLEXIBLE SHEETS OF CURED FOAMED RUBBER
John F. Moore, 100 Hillsdale Ave. W., Toronto, Ontario, Canada
Filed Oct. 15, 1959, Ser. No. 846,748
4 Claims. (Cl. 18—53)

This application is a continuation-in-part of application Serial No. 677,146, filed August 8, 1957, and now abandoned.

This invention relates to a continuous method of forming flexible sheets of heat cured plastic material. The invention is particularly applicable to the production of cavitied sheets of foamed natural or synthetic rubber such as are used in bed mattresses, upholstery and the like.

The object of the invention is to provide a continuous method of forming flexible sheets of cured foam rubber economically and efficiently, the sheets being of considerable width and of any desired length.

The invention will now be described by way of example with reference to the accompanying drawings in which:

FIGURE 1 is a diagrammatic perspective view of apparatus for carrying out the method according to the invention and partly broken away to show details of construction; and FIGURE 2 is a detail sectional elevation on a larger scale of part of the surface of the drum shown in FIGURE 1.

The invention will be described with reference to the manufacture of cavitied sheets of foam rubber such as are used in bed mattresses and upholstery.

The rubber compound which is used forms no part of the present invention and its composition will only be described somewhat briefly. The principal raw material used in the manufacture of foam rubber is natural latex or a mixture of natural and synthetic latices containing about 60% of solids by weight. The alkalinity of the latex is reduced to a suitable value by blowing air over the surface of the latex and then sulphur and other ingredients such as accelerators and anti-oxidants are added in the form of colloidal dispersions. The resulting mixture is then matured by heating for twenty hours at a temperature of 100° F. and is then cooled to about 70° F. Potassium oleate and/or castor oil soap are added in the desired proportions together with more sulphur and accelerators. The mixture is then cooled to about 50° F.

The resulting mixture is foamed in a conventional foaming machine consisting, for example, of an agitator in a closed chamber. The mixture is pumped into one end of the chamber and compressed air is also admitted so that, during agitation, the pressure is maintained at between twenty and forty pounds per square inch in the chamber. Just prior to its leaving the chamber the foamed mixture has added thereto gelling agents consisting of dispersions of zinc oxide and sodium silico-fluoride which are pumped into the chamber near the exit. The prepared foam, which is supported by the soap bubbles formed during foaming and which is hereinafter referred to as "soap supported foam," then flows through a flexible tube to the forming apparatus now to be described. The gelling agents used act at room temperatures but their action is accelerated by heat whereby, as described below, the foamed structure can be gelled rapidly before the soap bubbles decay.

Referring now to FIGURE 1, a drum, indicated generally at 10 is mounted for rotation about a horizontal axis 11. The drum is provided with end rings 12 each of which carries a flanged rail 13 which, in turn, engages with a pair of supporting and driving wheels 14. The wheels 14 are driven by an electric motor 15 through a pulley 16, belts 17, pulleys 18 and shafts 19 which are supported in trunnions 20. The drum has an outer surface which is provided by an aluminium cylinder indicated at 21 and has a plurality of outwardly directed projections some of which are indicated at 22.

Referring now to FIGURE 2, it will be seen that each projection 22 is in the form of a pin having a reduced end 23 which passes through a hole 24 in the aluminium cylinder 21. The reduced end 23 on each pin is provided with a peripheral groove which receives a spring-ring 25. The pins are mounted on the drum by inserting their reduced ends 23 through the holes 24 and then inserting the spring-rings 25 into the grooves to keep the pins in place. The drum is provided at each end with a perpiheral rim 26 connected to the end ring 12 by bolts 27. The peripheral rim 26 may be made either of electrically insulating material, for example, Bakelite, or of electrically conductive material. Similarly the pins 22 may either be made of electrically insulating material or of electrically conductive material to produce different effects as will hereinafter be described.

Returning now to FIGURE 1, a tank indicated generally at 28 surrounds the lower portion of the drum 10 and is filled with water to a level 29 above the horizontal axis 11 so that approximately three fifths of the peripheral surface of the drum is immersed in the water. The tank 28 has a framework 30 which supports the trunnions 20 and is provided with an external cover 31 and also with a slotted internal cover 32 extending within the drum 10.

Mounted adjacent to the uppermost portion of the outer peripheral surface of the drum 10 is a nozzle 33. Means consisting of a slideway 34 and a lead screw 35 are provided to reciprocate the nozzle 33 longitudinally of the drum across the whole length of the drum whereby rubber delivered from the nozzle is deposited over the whole length of the drum. Side guards 36 are provided to prevent the deposited rubber from overflowing from the ends of the drum and a water-cooled scraper 37 is provided adjacent to the nozzle 33 and has means (not shown) for adjustably spacing it from the surface of the drum by a distance which defines the thickness of the sheet produced on the drum. Pipes 38, 39 act as water inlets and outlets to the scraper 37. The drum is driven in an anti-clockwise direction as indicated by the arrow X.

Anti-clockwise of the nozzle 33 and the scraper 37 is arranged a heating electrode 40 spaced from the surface of the drum and connected to one terminal of a source of high frequency voltage, indicated diagrammatically at 40a. The electrode is supported in an insulated manner from the tank 28 by an arm 41. A roller 42 is mounted in ball bearings 43 adjacent to the point of entry of the drum into the tank and is rotated by contact with the rubber to smooth the surface of the rubber sheet before it enters the tank. Screw jacks 44 are provided to adjust the position of the roller 42.

Mounted above the drum and clockwise of the nozzle 33 are three fans indicated at 45 driven by electric motors 46 to force cooling air towards the surface of the drum, the fans being mounted on a framework, not shown. Mounted inside the drum are two spray tubes 47, 48 arranged to spray cooling water onto the interior surface of the drum. The tubes 47, 48 are supplied with water from a source (not shown) via a tube 49. Arranged adjacent to the point of exit of the drum from the tank is a take-off roller 50 and a support roller 51. The roller 50 is mounted in bearings 52 and the roller 51 is mounted in trunnions 53. A lower squeeze roller 54 is mounted in brackets 55 which also carry an upper squeeze roller 56 on an arm 57. A set screw 58 is provided to adjust the nip between the rollers 56 and 57. A steam pipe 59 leads from a source of steam, not shown, to the interior of the tank and an agitator 60 is mounted on a shaft 61 driven by the motor 15 and rotated to agitate the water in the tank. The other terminal of the source of high frequency is grounded to the tank 28 which is in electrical contact with the aluminium cylinder 21, the outside surface of the drum, and also with the pins 22, and/or rim 26, when made of electrically conductive material, through the water and the driving wheels 14.

The operation of the apparatus is as follows:

Foam rubber mix, prepared as described above, is delivered from a foaming machine to the nozzle 33 along a flexible tube 63 and is deposited on to the uppermost portion of the outer surface of the drum which provides a former for supporting the rubber. The material builds up behind the scraper 37 into a bank indicated at 64 and rotation of the drum in the direction of the arrow X moves a layer of the deposited rubber under the scraper 37, the layer is of sufficient depth to cover the pins 22 and has a portion overlying the pins. As the rubber passes under the electrode 40, the high frequency voltage impressed between the electrode 40 and the aluminium cylinder 21, assuming that the pins 22 and rim 26 are of electrically insulating material, causes dielectric heating of the rubber on the portion of the cylinder 22 opposite to the electrode and raises its temperature to approximately 100° F. If the projections 22 and the rim 26 are of electrically insulating material, and electrostatic field will be established between the electrode 40 and the outer surface o fthe aluminium cylinder 21 so that the whole thickness of the rubber will be subjected to the field and its gelling will be uniform throughout its thickness.

On the other hand, if the pins 22 are of electrically conductive material while the rim 26 is of electrically insulating material, the electrostatic field will be set up between the free ends of the pins and the electrode 40, thus raising the temperature of the portion of the foam overlying the pins. This overlying portion will thus gel first and the foam under the overlying portion will gel more slowly by virtue of the gelling agents incorporated in the foam mix as described above. The accelerated gelling of the overlying portion will stabilize the foam on the drum preventing substantial movement of the foam relative to the drum surface.

When the rim 26 is made of electrically insulating material, it does not modify the electrostatic field established between the electrode and the surface of the cylinder, if the pins 22 are of insulating material, or between the ends of the pins 22 when the latter are made of electrically conductive material. If, however, the rim 26 is made of electrically conductive material, the electrostatic field will be established between the electrode and the rim in the vicinity of the rim. At a short distance from such a rim, the electrostatic field will be substantially the same as with a rim of insulating material but the depth of the foam within the electrostatic field, and heated dielectrically thereby, becomes less the nearer the foam is to the rim and is zero at the rim. Under some circumstances, this lack of rapid gelling is acceptable.

At the temperature of 100° F. gelation of the mix is accomplished in one or two minutes. This comparatively rapid gelation is such that the rubber is gelled before the foam structure in the rubber has had time to break down and so that a very fine foamed structure is attained in the rubber and the rubber is stabilized relatively to the drum. When electrically conductive pins 22 are used the underlying layer of foam may take about 5 minutes to gel but the foam is prevented from flowing by the pins 22 and by the previously gelled overlying portion of the foam. As the drum rotates further, the deposited rubber layer has its outer surface smoothed by the roller 42 and then passes into the tank 28 and then into the hot water in the tank.

The water in the tank is maintained at about 210° F. by the admission of steam through the pipe 59 and as the deposited material passes through the tank it is cured by the hot water in about 15 minutes. As the rubber is cured, it tends to bake onto the outer surface of the drum, but the abundance of water in the tank and the period of time that the rubber and the drum surface are immersed therein, serves the additional purpose of dissolving the adhesive bond between the cured rubber and the drum so that the cured rubber may be easily removed from the drum.

Moreover, the water tends to support the rubber in contact with the undersurface of the drum, since the apparent weight of the rubber when immersed is less than its actual weight by an amount equal to the weight of the water displaced.

Gelled, but uncured foam rubber has very little inherent strength, but the "lift" given to the foam rubber by the water is sufficient to prevent the sheet from breaking while it is on the underside of the drum. For example, a piece of foam rubber in hot water will float with its upper surface just touching the water surface so that the rubber is "weightless." During curing there is a shrinkage of about 3% and this also helps to keep the foam sheet in contact with the drum. It is thus unnecessary to provide belts or the like to maintain the rubber in contact with the underside of the drum.

A further advantage of the invention is that it is unnecessary to use lubricants between the rubber and the drum if the liquid of the curing bath is such that it will dissolve the adhesive bond formed as the rubber bakes on to the former. Lubricants may, however, be used when making cavitied sheets of foam rubber since the foam is stabilized on the drum by gelation and the pins 22. However, when uncavitied sheets of foam rubber are being made, lubricants should not be used since the foam is stabilized on the drum by being bonded to the surface thereof during gelation.

Further rotation of the drum eventually carries the layer of cured rubber out of the water and then out of the tank. After leaving the tank, the cured rubber is removed from the drum surface and is led across the rollers 50 and 51 and between the squeeze rollers 54 and 56. After leaving the squeeze rollers 54 and 56 the rubber is further squeezed and dried in a conventional manner which does not form part of the invention. A foam rubber product permanently assumes the shape in which it is dried and therefore in the method of the invention the products will be flat although cured on the curve.

As the drum rotates further, that part of its surface which is now free of rubber passes between the water sprays 47, 48 in the interior of the drum, which cool the metal surface of the cylinder 21, and the fans 45 on the exterior of the drum, which cool the pins 22 and rims 26. The surface of the drum and the projections and rims are cooled to between 85° and 90° F. Further foam rubber is then deposited on this portion of the surface by the nozzle 33 and the process is continued.

In the embodiment of the invention described, the foam rubber is immersed in the water in the tank for about 15 minutes and the time interval from deposition of the rubber onto the drum until the rubber enters the liquid in the tank is about 5 minutes which is sufficient to gel the underlying portion of the material when electrically conductive pins are used. Similarly, the time interval taken for a point on the drum to pass from the outlet of the tank to the nozzle is also 5 minutes. It will be appreciated that the speed of the drum and the level of the water in the tank may be adjusted to vary these periods to the desired value. Thus a lower water level in the tank would provide a shorter curing time whereas increasing the speed of rotation of the drum would also provide a shorter curing time with the same water level.

Although the point of deposition of the rubber onto the drum is shown in FIGURE 1 as being at the uppermost point of the drum, the point of deposition can be set back in a clockwise direction if desired. One limiting feature is that the rubber deposited on the drum must not run in a clockwise direction around the drum. It will be appreciated that this limiting feature will in turn be determined by the viscosity of the rubber and also by the speed of rotation of the drum. The faster the drum rotates, and the more viscous is the rubber, the further the point of deposition of the nozzle can be moved in a clockwise direction from the uppermost point on the drum. The point of deposition could also be set forward in a counter clockwise direction, the limiting feature being that the rubber must be gelled before it is inclined at such a slope that it runs around the drum in an anticlockwise direction.

A third limiting feature of the position of the nozzle is that the drum surface, the projections 22 and the rims 26 should be cooled to between about 85° and 90° F. after they have left the bath and before the rubber is deposited on the surface. Thus if the nozzle is moved too far in a clockwise direction the surface of the drum will not have sufficient time to cool to the requisite extent.

A dielectric heating electrode has been shown in the embodiment described and it will be appreciated that this heating method is necessary when making thick sections of foam material, due to the poor thermal conductivity of the foam. Infra-red heating could be used to gel the rubber if desired when thin sections are being made. Alternatively, the rubber could be gelled by passing it through a chamber containing a steam and air mixture.

The use of pins 22 of electrically conductive material in combination with high frequency heating has the following advantages compared with the use of pins of electrically insulating material and high frequency heating:

(1) The drum and pins are less expensive to manufacture than if insulating pins are used;

(2) The drum and pins are easier to assemble than if insulating pins are used;

(3) Less high frequency power is required with metal pins since the layer of rubber gelled is thinner than if insulating pins are used;

(4) Metal pins are generally more robust than pins of electrically insulating material such as Bakelite or porcelain; and (5) Metal pins may be cooled more easily than electrically insulating pins.

The advantages of using a rim 26 of electrically conductive material are similar to those obtained by using pins of electrically conductive material, i.e. less expensive, easier to assemble, more robust and easier to cool as compared with a rim of electrically insulating material.

If it is desired to raise the temperature of the curing bath various salts, e.g. calcium chloride can be dissolved in the water to raise its boiling point.

If the apparatus is to be used for the manufacture of mattresses or similar discrete articles, axially directed partitions may be arranged on the drum surface to divide the surface up into a number of compartments, the partitions extending outwardly through only part of the full depth of the deposited sheet. By this means a plurality of articles may be formed joined together by their webs which may be easily severed. Rounded fillets may be placed at the intersections of the partitions and the upstanding rims of the drum so that the articles are formed with rounded corners. If desired the surface of the drum could be locally flattened so that the outer face of the product would be "crowned."

The apparatus can also be used for the manufacture of composite foam rubber and cloth sheets, the cloth being fed onto the drum in advance of the deposition point of the rubber. Alternatively the cloth may be fed down the scraper blade so that the cloth lies on top of the rubber.

Although the invention has been described with reference to the manufacture of cavitied sheets of foamed rubber, it will be appreciated that if the projections 22 are omitted from the surface of the drum and the surface of the drum is made imperforate, the apparatus may be operated to produce plane sheets of foamed rubber in the same manner as that described for the production of cavitied sheets.

It is to be understood that the form of the invention herewith shown and described is to be taken as a preferred example of the same and that various changes in the shape, size and arrangement of the parts may be resorted to without departing from the spirit of the invention or the scope of the subjoined claims.

What I claim as my invention is:

1. A continuous method of forming a flexible sheet of cured foamed material, having cavities in one face thereof, the material being selected from the group consisting of natural rubber, synthetic rubbers, mixtures of natural and synthetic rubbers and mixtures of synthetic rubbers, including the steps of depositing uncured, soap supported, foamed material onto a continuous rigid former to support the material, said material containing a gelling agent whose action is accelerated by heat, and the former having projections thereon to form the cavities; passing the former and deposited material through a heating zone to heat the material and to cause the gelling agent rapidly to gel the material and to stabilize it relatively to the former, passing the gelled material and former together through a curing bath of a hot liquid so that substantially the whole of the volume of the gelled material is immersed in the liquid, the former being passed through the bath in a path such that, as the material is cured by the liquid, the material is supported against the former by the buoyancy of the material in the liquid; removing the material and the former from the bath; and removing the cured material from the former.

2. A continuous method of forming a flexible sheet of cured foamed material, having cavities in one face thereof, the material being selected from the group consisting of natural rubber, synthetic rubbers, mixtures of natural and synthetic rubbers and mixtures of synthetic rubbers, including the steps of continuously depositing uncured, soap supported, foamed material onto a continuous rigid former to support the material, said material containing a gelling agent whose action is accelerated by heat, and the former having projections thereon to form the cavities; passing the former and deposited material through a heating zone to heat the material and to cause the gelling agent rapidly to gel the material and to stabilize it relatively to the former, passing the gelled material and former through a curing bath of a hot liquid so that substantially the whole of the volume of the gelled material supported by the former is immersed in the liquid, the former being passed through the bath in an arcuate path such that, as the material is cured by the liquid, the material is supported against the former by the buoyancy of the material in the liquid; removing the material and the former from the bath; and removing the cured material from the former.

3. A continuous method of forming a flexible sheet of cured foamed material having cavities in one face thereof, the material being selected from the group consisting of natural rubber, synthetic rubbers, mixtures of natural and synthetic rubbers and mixtures of synthetic rubbers, including the steps of depositing uncured, soap supported, foamed material onto a continuous rigid former to support the material, the former having projections to form the cavities and the material containing a gelling agent whose action is accelerated by heat and being deposited on the former in sufficient depth to have a portion overlying said projections; subjecting said overlying portion of the material to heat to cause the gelling agent to rapidly gel said portion thus to stabilize the material relatively to the former; subsequently gelling the remainder of the material under said overlying portion with the gelling agent; passing the material and the former together through a curing bath of a hot liquid in an arcuate path so that substantially the whole of the volume of the gelled material supported by the former is immersed in the liquid, the rigid former being passed through the bath in an arcuate path such that, as the material is cured, it is supported against the former by its buoyancy in the liquid; removing the material and the former from the bath and removing the cured material from the former.

4. A continuous method of forming a flexible sheet of cured foamed rubber, said sheet having cavities in one face thereof, comprising depositing uncured, soap-supported, foamed rubber latex material onto a continuous rigid former to provide a sheet of said latex material having an inner face supported by said former and having a free outer face, said former having projections thereon to form said cavities in the inner face of said sheet; said rubber latex material containing a gelling agent whose action is accelerated by heat; passing the former and deposited material through a heating zone to cause the gelling agent rapidly to gel the material and to stabilize it relatively to the former; passing the gelled material and former together through a curing bath of hot water so that substantially the whole of the volume of the gelled material is immersed in the water, the former being passed through the bath in a path such that, as the material is cured by the hot water the material lies beneath the former and is supported against the former by the buoyancy of the material in the water; removing the material and former from the bath; and removing the cured material from the former, the inner face of the material remaining against the rigid former throughout the entire gelling and curing operation.

References Cited in the file of this patent

UNITED STATES PATENTS

| | | |
|---|---|---|
| 1,528,537 | Draemann | Mar. 3, 1925 |
| 2,308,951 | Novotny et al. | Jan. 19, 1943 |
| 2,371,155 | Czapek | Mar. 13, 1945 |
| 2,673,723 | Keen | Mar. 30, 1954 |
| 2,693,006 | Shigekawa | Nov. 2, 1954 |
| 2,822,573 | Wasniewski et al. | Feb. 11, 1958 |
| 2,841,856 | Gelbman | July 8, 1958 |

FOREIGN PATENTS

| | | |
|---|---|---|
| 466,629 | Great Britain | June 1, 1937 |
| 477,911 | Great Britain | Jan. 10, 1938 |

OTHER REFERENCES

The Vanderbilt Latex Handbook, 1954, Winspear, George G. (ed.), published by R. T. Vanderbilt Co., Inc., New York, pp. 215–227.